(12) United States Patent
Wippler, III (10) Patent No.: US 9,429,436 B2
(45) Date of Patent: Aug. 30, 2016

(54) ESTIMATED TIME OF ARRIVAL FOR VEHICLE NAVIGATION

(71) Applicant: Toyota Motor Engineering & Manufacturing North America, Inc., Erlanger, KY (US)

(72) Inventor: Erik Anthony Wippler, III, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/595,626

(22) Filed: Jan. 13, 2015

(65) Prior Publication Data

US 2016/0202069 A1 Jul. 14, 2016

(51) Int. Cl.
*G01C 21/26* (2006.01)

(52) U.S. Cl.
CPC .................................. *G01C 21/26* (2013.01)

(58) Field of Classification Search
CPC ..... G07B 15/063; H04W 4/14; G01C 21/36; G01C 21/26; G01C 21/3461; G01C 21/3484; G06Q 30/0284; G06Q 30/04; G08G 1/207
USPC ............ 705/13, 30; 701/400, 414, 300, 410, 701/533; 455/466; 340/928
See application file for complete search history.

(56) References Cited

U.S. PATENT DOCUMENTS

| 6,269,303 B1* | 7/2001 | Watanabe | G01C 21/3461 340/988 |
|---|---|---|---|
| 6,950,743 B2 | 9/2005 | Kainuma et al. | |
| 7,250,876 B2 | 7/2007 | Saze et al. | |
| 7,956,768 B2* | 6/2011 | Roberts | G03Q 30/0284 235/378 |
| 2007/0021905 A1* | 1/2007 | Takashima | G01C 21/3484 701/533 |
| 2008/0221787 A1 | 9/2008 | Vavrus | |
| 2009/0024321 A1* | 1/2009 | Bando | G01C 21/36 701/414 |
| 2010/0287038 A1 | 11/2010 | Copejans | |
| 2012/0232964 A1 | 9/2012 | Brands | |
| 2012/0265430 A1* | 10/2012 | Weimann | G08G 1/207 701/300 |
| 2013/0030964 A1* | 1/2013 | Nuzzi | G06Q 30/04 705/30 |
| 2013/0090991 A1* | 4/2013 | Underwood | G07B 15/063 705/13 |
| 2013/0095864 A1* | 4/2013 | Marovets | H04W 4/14 455/466 |
| 2014/0200804 A1 | 7/2014 | Wippler | |

FOREIGN PATENT DOCUMENTS

| JP | 2006184231 A | 7/2006 |
|---|---|---|
| JP | 2006338375 A | 12/2006 |
| JP | 2012177642 A | 9/2012 |
| JP | 2013096871 A | 5/2013 |

* cited by examiner

*Primary Examiner* — Yuri Kan
(74) *Attorney, Agent, or Firm* — Christopher G. Darrow; Darrow Mustafa PC (57) ABSTRACT

Arrangements related to determining an estimated time of arrival for vehicle navigation are described. A travel route between an origin and a destination is determined. The travel route includes a toll road. It can be determined whether one or more toll payment areas are located along the toll road. A toll payment delay for the one or more toll payment areas can be determined. Responsive to receiving an indication of automatic toll payment, the toll payment delay for the one or more toll payment areas can be adjusted. An estimated time of arrival to the destination can be determined using the adjusted toll payment delay for the one or more toll payment areas. The determined estimated time of arrival can be presented to a user.

20 Claims, 5 Drawing Sheets

ESTIMATED TIME OF ARRIVAL FOR VEHICLE NAVIGATION

FIELD

The subject matter described herein relates in general to vehicle navigation and, more particularly, to determining an estimated time of arrival for vehicle navigation.

BACKGROUND

Vehicle navigation systems can determine a travel route between an origin and a destination. Some vehicle navigation systems are configured to calculate an estimated time of arrival at the destination. The estimated time of arrival is calculated based on a plurality of factors, such as the travel route, the total distance, posted speed limits, current road speeds and/or predicted or average vehicle speed along the travel route.

In some instances, a portion of a travel route may include one or more toll roads. Toll roads require payment of a fee to drive a vehicle on such roads. The fees are paid at toll payment booths located along the toll road. A driver must stop the vehicle to pay the appropriate toll at each toll payment booth. Backups and delays at toll payment booths may occur. Such stopping, backups or delays can affect the accuracy of the determined estimated time of arrival at a destination.

Some toll roads have programs which allow tolls to be automatically paid. In such instances, a transponder may be placed within a vehicle. A vehicle equipped with such a transponder can pass through a toll payment booth or a designated automatic toll payment lane. The transponder transmits a signal to or is otherwise detected by sensors positioned with respect to the toll payment booth or the designated automatic toll payment lane. When the transponder is detected, the appropriate toll is deducted from or charged to an account associated with the transponder.

SUMMARY

In one respect, the present disclosure is directed to a method for estimating time of arrival for vehicle navigation. The method can include determining a travel route between an origin and a destination. The travel route can include a toll road. The method can also include determining whether one or more toll payment areas are located along the toll road. The method can further include determining a toll payment delay for the one or more toll payment areas. Responsive to receiving an indication of automatic toll payment, the method can include adjusting the toll payment delay for the one or more toll payment areas. The method can also include determining an estimated time of arrival to the destination using the adjusted toll payment delay for the one or more toll payment areas. The method can further include presenting the determined estimated time of arrival to a user. One or more of the above aspects of the method can be performed using a processor.

In another respect, the present disclosure is directed to a system for determining an estimated time of arrival for vehicle navigation. The system can include a processor. The processor can be programmed to initiate executable operations. The executable operations can include determining a travel route between an origin and a destination. The travel route can include a toll road. The executable operations can also include determining whether one or more toll payment areas are located along the toll road. The executable operations can further include determining a toll payment delay for the one or more toll payment areas. Responsive to receiving an indication of automatic toll payment, the executable operations can include adjusting the toll payment delay for the one or more toll payment areas. The executable operations can include determining an estimated time of arrival to the destination using the adjusted toll payment delay for the one or more toll payment areas. The executable operations can also include presenting the determined estimated time of arrival to a user.

DETAILED DESCRIPTION

This detailed description relates to determining an estimated time of arrival for vehicle navigation. More particularly, the estimated time of arrival can be determined and/or configured for vehicles that are equipped for automatic toll payment (e.g. by an automatic toll payment device). In one or more implementations, responsive to receiving an indication that tolls will be paid automatically, traffic delays associated with toll payment booths along a travel route can be adjusted for purposes of determining the estimated time of arrival. The present detailed description relates to systems, methods and computer program products that incorporate such features. In at least some instances, such systems, methods and computer program products can, for example, improve the accuracy of the estimated time of arrival determination and/or can increase user satisfaction with navigation systems that make such determinations.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
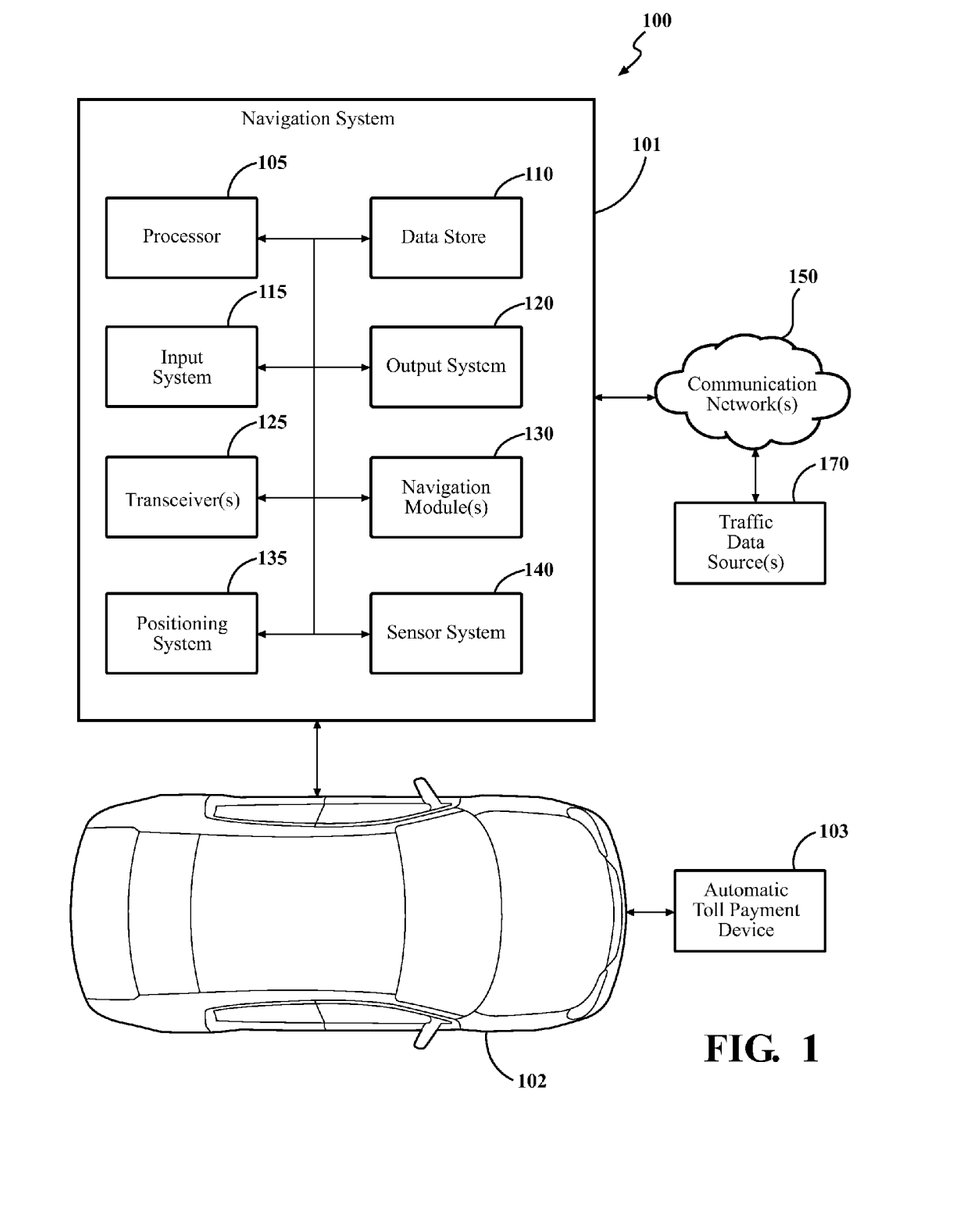
FIG. 1 is an example of a system configured to determine an estimated time of arrival.

Referring to FIG. 1, an example of a system 100 is shown. The system 100 includes a vehicle 102. As used herein, "vehicle" means any form of motorized transport. In one or more implementations, the vehicle 102 can be an automobile. While arrangements will be described herein with respect to automobiles, it will be understood that embodiments are not limited to automobiles. In some implementations, the vehicle 102 may be a motorcycle, watercraft, an aircraft or any other form of motorized transport.

The vehicle 102 can be operated on a road. "Road" means any surface upon which a motorized vehicle can travel, including roadways, streets, highways, expressways, dirt roads, paved or unpaved roads, etc. The road can be a private or a public road. The road can be a toll road. As used herein, "toll road" means any road in which a fee is charged for use thereof. The term "toll road" includes turnpikes, tollways and toll roads.

In some instances, there can be one or more toll payment areas located along a toll road. As used herein, "toll payment area" means any spot, location, travel lane, zone, area, place, booth, toll houses, plaza, station, gate and/or structure in which a toll is collected or is designated to be collected for the use of at least a portion of a toll road.

In one or more arrangements, a toll payment device 103 can be operatively associated with the vehicle 102. "Operatively associated with" means located in, on or near and includes direct or indirect connections, including connections without direct physical contact. "Toll payment device" means any device that can be detected by an automatic toll collection system so that a toll can be charged, debited, billed and/or collected from an account associated with the toll payment device. In one or more arrangements, the toll payment device 103 can be a transmitter, a responder or a transponder. In one or more arrangements, the toll payment device 103 can be a barcode or other machine readable identifier. The toll payment device 103 can be located within the vehicle 102 or on the exterior of the vehicle 102. The toll payment device 103 can be permanently installed in the vehicle 102, or the toll payment device 103 can be temporarily installed in the vehicle 102. In one or more arrangements, the toll payment device 103 can be a portable unit that can be readily used in connection with a plurality of vehicles and/or selectively used in one vehicle.

In some instances, a toll collection system can be configured so that the vehicle 102 can automatically pay tolls without a toll payment device 103. For instance, some automatic toll collection systems use automatic number plate recognition. In such systems, cameras and/or optical character recognition is used to read the license plates on vehicles. In some instances, automatic number plate recognition can be used in combination with the toll payment device 103.

Various automatic toll collection systems are used throughout the world. In the United States, some examples of automatic toll collection system include: Freedom Pass (Alabama), E-ZPass network (Delaware, Illinois, Indiana, Maine, Maryland, Massachusetts, New Hampshire, New Jersey, New York, North Carolina, Ohio, Pennsylvania, Rhode Island, Virginia, West Virginia), I-Pass (Illinois), NC Quick Pass (North Carolina), SunPass/E-PASS/LeeWay/O-PASS/C-Pass (Florida), TxTAG/TollTag/EZ TAG (Texas), Peach Pass (Georgia), EXpressToll (Colorado), Fastrak (California), Good To Go! (Washington state), K-Tag (Kansas), MnPass (Minnesota), Palmetto Pass (South Carolina), Pikepass (Oklahoma), and GeauxPass (Louisiana).

In some instances, a toll road can include one or more automatic toll payment areas. An "automatic toll payment area" means any spot, location, travel lane, zone, area, place, booth, toll houses, plaza, station, gate and/or structure which is designated for only automatic toll collection for the use of at least a portion of a toll road. In automatic toll payment areas, a vehicle does not have to stop to pay a toll. Some toll payment areas are exclusively automatic toll payment areas. To properly use such toll payment areas, a vehicle must be equipped for automatic toll payment. Some toll payment areas support both automatic and manual payment of tolls. For example, there can be a mix of automatic toll payment areas and non-automatic toll payment areas. As another example, one or more toll payment areas can support both manual and automatic toll payment. In one or more arrangements, one or more travel lanes can include an automatic toll payment area, and one or more other travel lanes can include toll payment areas in which the toll can be paid automatically or manually. Manual toll payment means that a vehicle must stop to pay the toll.

One type of an automatic toll payment area is referred to as open road tolling. Open road tolling is a system in which tolls are collected without the use of an actual toll booth. In open road tolling, a vehicle can drive through a toll payment area at posted speeds without having to stop, slow down or significantly slow down to pay the toll.

The system 100 can include a navigation system 101. "Navigation system" means one or more components, mechanisms, devices, elements, components, systems, modules, applications and/or combinations thereof, now known or later developed, configured to determine a current geographic location of a vehicle or the system, determine one or more travel routes between an origin and a destination, determine a distance for a determined or selected travel route and/or determine an estimated time of arrival for a determined or selected travel route. As used herein, "estimated time of arrival" is a measure, prediction, estimation and/or determination of when arrival at a destination is expected. The estimated time of arrival can be expressed in any suitable manner. For example, the estimated time of arrival can be expressed as the total amount of time to reach a destination from an origin or a current location. Alternatively or in addition, the estimated time of arrival can be expressed as a time at which a destination will be reached (e.g. the current time plus the predicted total amount of time to reach a destination from an origin or a current location).

Some of the possible elements of the navigation system 101 are shown in FIG. 1 and will now be described. It will be understood that it is not necessary for the navigation system 101 to have all of the elements shown in FIG. 1 or described herein. The navigation system 101 can have any combination of the various elements shown in FIG. 1. Further, the navigation system 101 can have additional elements to those shown in FIG. 1. In some arrangements, the navigation system 101 may not include one or more of the elements shown in FIG. 1. In some arrangements, one or more elements of the navigation system 101 can be a part of another system of the vehicle 102. Further, the elements shown may be physically separated by large distances.

The navigation system 101 is shown as being operatively associated with (e.g. located within and/or on) the vehicle 102 in FIG. 1, it will be understood that one or more of these elements can be located external to and/or remote from the vehicle 102. In one or more arrangements, one or more of the elements of the navigation system 101 can be provided together as a navigation unit that can be used in connection with the vehicle 102. In one or more arrangements, such a navigation unit can be installed in the vehicle 102. In one or more arrangements, such a navigation unit can be configured to be portable so that it can be selectively placed in and removed from the vehicle 102. In such case, the navigation unit can be selectively used in a plurality of vehicles, as a handheld device and/or in one or more non-vehicular applications.

The navigation system 101 can include one or more processors 105. "Processor" means any component or group of components that are configured to execute processes (including any of the processes described herein) or any form of instructions to carry out such processes or cause such processes to be performed. The processor 105 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 105 can include at least one hardware circuit (e.g., an integrated circuit) configured to carry out instructions contained in program code. In arrangements in which there is a plurality of processors 105, such processors can work independently from each other or one or more processors can work in combination with each other.

The navigation system 101 can include one or more data stores 110 for storing one or more types of data. The data store 110 can include volatile and/or non-volatile memory. Examples of suitable data stores 110 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 110 can be a component of the processor 105, or the data store 110 can be operatively connected to the processor 105 for use thereby. The term "operatively connected," as used throughout this description, can include direct or indirect connections, including connections without direct physical contact.

The navigation system 101 can include an input system 115. An "input system" is defined as a component, system, device, element or arrangement or groups thereof that enable information/data to be entered into a machine. The input system 115 can receive an input from a user (e.g. a person, a vehicle occupant, etc.). Any suitable input system 115 can be used, including, for example, a keypad, display, touch screen, multi-touch screen, button, joystick, mouse, trackball, microphone and/or combinations thereof.

The navigation system 101 can include an output system 120. An "output system" is defined as a component, system, device, element or arrangement or groups thereof that enable information/data to be presented to a user (e.g. a person, a vehicle occupant, etc.). The output system 120 can include one or more visual outputs, including, for example, one or more displays. Alternatively or in addition, the output system 120 may include one or more audial outputs, including, for example, a microphone, earphone and/or speaker.

One or more components, systems, devices, elements and/or arrangements may serve as both a component of the input system 115 and of the output system 120. For example, a display may serve as both a component of the input system 115 and as a component of the output system 120. Further, one or more components, systems, devices, elements and/or arrangements of the navigation system 101 may also serve as a component, system, device, element and/or arrangement of the vehicle 102. For instance, a display of the navigation system 101 can also be part of a radio system or a monitoring system of the vehicle 102.

The navigation system 101 can include one or more transceivers 125. A "transceiver" is defined as a component or a group of components that transmit signals, receive signals or transmit and receive signals, whether wirelessly or through a hard-wired connection. The transceiver 125 can be operatively connected to the processor 105 and/or the data store 110. Any suitable transceiver can be used to access a network, access point, node or other electrical device for the transmission and receipt of data. The transceiver 125 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The transceiver 125 can include any wireless technology developed in the future. Again, the transceiver 125 can include one or more transceivers and can be any suitable combination of transceivers, including any combination of the transceivers noted above. However, it will be understood that arranged described herein are not limited to wireless transceivers. Indeed, the transceiver 125 can be configured for wired network connections.

The navigation system 101 can include one or more navigation modules 130. The navigation module 130 can be implemented as computer readable program code that, when executed by a processor, implement various processes described herein. For instance, the navigation module 130 can be configured to: determine a current geographic location of the vehicle 102 and/or the navigation system 101, determine one or more travel routes between an origin and a destination, determine one or more revised travel routes based on a changed condition (e.g. route, location, traffic, etc.), determine a distance for a determined or selected travel route and/or determine an estimated time of arrival for a determined or selected travel route.

The navigation module 130 can be a component of and/or executed on the processor 105, or the navigation module 130 can be executed on and/or distributed among other processing systems to which the processor 105 is operatively connected. The navigation module 130 can include instructions (e.g., program logic) executable by the processor 105. Alternatively or in addition, the data store 110 may contain such instructions.

In one or more arrangements, the navigation module 130 can include, have access to and/or can execute one or more mapping applications or map data to determine a travel route between an origin and a destination. The origin or destination can be provided in any suitable manner. For instance, a driver or passenger of the vehicle 102 or other user of the navigation system 101 may input an origin and/or a destination. The navigation module 130 can determine one or more suitable travel routes between the origin and the destination. A travel route may be selected based on one or more parameters (e.g. shortest travel distance, shortest amount of travel time, etc.). In some arrangements, the navigation module 130 can be configured to update the travel route dynamically. Such updating can be performed while traveling along the travel route and/or as the location of the navigation system 101 (and/or the vehicle 102) changes. Such updating can be performed responsive to a change in conditions or information (e.g. traffic, accidents, road closures, etc.).

The navigation system 101 can include a positioning system 135, which can include, for example, a global positioning system, a local positioning system or a geolocation system. The navigation module 130 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the positioning system 135 can use Transmission Control Protocol (TCP) and/or a Geographic information system (GIS) and location services.

The positioning system 135 may include a transceiver (e.g. transceiver 125 and/or other transceiver) configured to estimate a position of the vehicle 102 with respect to the Earth. For example, positioning system 135 can include a GPS transceiver to determine the vehicle's latitude, longitude and/or altitude. The positioning system 135 can use other systems (e.g. laser-based localization systems, inertial-aided GPS, and/or camera-based localization) to determine the location of the vehicle 102 and/or the navigation system 101.

Alternatively or in addition, the positioning system 135 can be based on access point geolocation services, such as using the W3C Geolocation Application Programming Interface (API). With such a system, the location of the vehicle 102 and/or the navigation system 101 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 102 and/or the navigation system 101 is determined will depend on the manner of operation of the particular location tracking system used.

The navigation system 101 can be configured to obtain traffic condition information or data from any suitable source of such information or data. For instance, the navigation system 101 and/or one or more components of navigation system 101 can be communicatively linked to one or more traffic data sources 170 through one or more communication networks 150. As used herein, the term "communicatively linked" can include direct or indirect connections through a communication channel or pathway or another component or system. A "communication network" means one or more components designed to transmit and/or receive information from one source to another.

The one or more communication networks 150 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 150 further can be implemented as or include one or more wireless networks, whether short or long range. For example, in terms of short range wireless networks, the communication network 150 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 150 can include a mobile, cellular, and or satellite-based wireless network and support voice, video, text, and/or any combination thereof. Examples of long range wireless networks can include GSM, TDMA, CDMA, WCDMA networks or the like. The communication network 150 can include wired communication links and/or wireless communication links. The communication network 150 can include any combination of the above networks and/or other types of networks. The communication network 150 can include one or more routers, switches, access points, wireless access points, and/or the like.

The traffic data source 170 can be any source of traffic-related information or data. The traffic data source 170 can be, for example, a traffic server, a traffic condition database, a traffic news source, an online traffic database (e.g. a traffic-related website), a publication, a system or a source, as may be available from one or more public agencies (e.g. a national, state or local department of transportation), one or more public groups (e.g. a news reporting agencies) and/or one or more private groups. The navigation system 101 can be configured to determine or obtain traffic-related information or data in real-time. As used herein, the term "real-time" means a level of processing responsiveness that a user or system senses as sufficiently immediate for a particular process or determination to be made, or that enables the processor to keep up with some external process.

Examples of traffic-related information or data that can be obtained by the navigation system 101 can include: traffic alerts, road closures, accidents, congestion, construction, current traffic speed, posted speed limit and/or other traffic related events. Additional examples of traffic-related information or data include the identification of toll roads, the location of toll payment areas along a toll road, the type of each automatic toll payment area (e.g. open road tolling, a toll payment booth, designated automatic toll payment lanes, non-automatic toll payment lanes, etc.), current traffic delays at automatic toll payment areas, and/or current wait times at automatic toll payment areas. In one or more arrangements, the navigation system 101 can obtain historical traffic-related information or data (e.g. historical traffic delay data or information) for a given location.

As noted above, the navigation module 130 can be configured to determine an estimated time of arrival at a destination. The estimated time of arrival can be determined in any suitable manner, now known or later developed. The estimated time of arrival is determined based on a plurality of factors. Examples of such factors can include the travel route, the total distance, speed limits, predicted vehicle speed and/or average vehicle speed. As a non-limiting example, the estimated time of arrival can be determined, at least in part, by dividing the total distance between the origin and the destination by the average vehicle speed (as determined by the posted speed limits) over the total distance.

Further examples of factors include current traffic conditions (e.g. current traffic levels, accidents, current road speeds and/or backups) or actual speed of the vehicle along the travel route. For instance, if a vehicle actually stops at a toll payment area, such stopping can be considered when determining or updating the estimated time of arrival.

In one or more arrangements, the estimated time of arrival can be updated continuously, periodically or at any suitable interval based on one or more factors. Non-limiting examples of such factors include current traffic conditions, changes in traffic conditions and/or actual speed of the vehicle along the current travel route.

The determination of the estimated time of arrival at a destination can also be based on toll payment delays at toll payments areas located on a toll road. "Toll payment delay" means the additional time that is required to pay a toll at a toll payment area located on a toll road. According to arrangements herein, the toll payment delays can be an amount of time that is added to the estimated time of arrival. Thus, in the above example of determining the estimated time of arrival, the estimated time of arrival can be increased by the toll payment delay determined for each toll payment area located along the travel route. The toll payment delay can be included in the determination of the estimated time of arrival in any suitable manner.

The toll payment delay can be determined in any suitable manner. For instance, the toll payment delay can be a predetermined amount of time for each toll payment area. In one or more arrangements, the predetermined amount of time for each toll payment area can be the same for all toll payment areas along a toll road. In one or more arrangements, the predetermined amount of time associated with at least one toll payment area can be different than the predetermined amount of time associated with the other toll payment areas along the toll road.

In one or more arrangements, the toll payment delay can be determined and/or updated based on current traffic condition information or data. For instance, current traffic condition data or information can be obtained from any suitable source (e.g. traffic data source(s) 170). As an example, a traffic data source 170 may indicate that there is an average of a two minute wait at a toll payment area on a toll road. In such case, the toll payment delay can be determined to be about two minutes or more. The toll payment delay can vary over time. Alternatively or in addition to average wait times, the traffic data source 170 may also indicate minimum and/or maximum wait times at a toll payment area. In some instances, when a toll payment area includes a plurality of travel lanes, the source of current traffic condition data may provide the wait time separately for each of the plurality of travel lanes.

Some toll roads are configured for automatic toll payment. In such cases, a toll payment area can be configured to automatically collect an appropriate toll. A separate toll payment area may be designated for automatic toll payment. In such cases, a vehicle can automatically pay the toll typically without having to stop. Moreover, the vehicle may not have to reduce its speed, or it may not have to substantially reduce its speed. Accordingly, the toll payment delay associated with one or more toll payment areas located along a travel route can be adjusted if the navigation system 101 receives an indication of automatic payment of tolls. In this respect, "adjusted" means that the toll payment delay for a toll payment area is reduced, ignored, or otherwise filtered and thus effectively ignored. "Indication of automatic payment of tolls" means any input or signal that instructs, advises, explains, commands, or otherwise indicates that tolls will automatically be paid at automatic toll payment areas located along a toll road. If a toll payment delay associated with one or more toll payment areas located along a travel route is adjusted, the adjusted toll payment delay can be used in the determination of an estimated time of arrival.

The toll payment delay can be adjusted in any suitable manner. For instance, the toll payment delay can be reduced to a predetermined amount of time. In one or more arrangements, the predetermined amount of time can be 0 seconds, 5 seconds or less, 10 seconds or less, 15 seconds or less, 20 seconds or less, 25 seconds or less, or 30 seconds or less, just to name a few possibilities.

In one or more arrangements, the toll payment delay can be reduced by a predetermined percentage. For instance, in one or more arrangements, the predetermined percentage can be at least about 75 percent, at least about 80 percent, at least about 85 percent, at least about 90 percent, at least about 95 percent, or 100 percent, just to name a few possibilities. In one or more arrangements, the toll payment delay can be reduced by a predetermined reduction amount. For instance, the predetermined reduction amount can be 5 seconds, 10 seconds, 15 seconds, 20 seconds, 25 seconds, 30 second, 35 seconds, 40 seconds, 45 seconds, 50 seconds, 55 seconds or 60 seconds.

In certain circumstances, the navigation system 101 can be configured to ignore the received indication of automatic payment of tolls. For instance, if traffic-related data indicates that there is an actual traffic delay at an automatic toll payment area, then the estimated time of arrival can be determined using the actual traffic delay or the non-adjusted toll payment delay, even if an indication of automatic payment of tolls has been received. Thus, if there is actually a delay at a designated automatic toll payment area of a toll road, the toll payment delay will not be adjusted.

In one or more arrangements, the navigation system 101 can include a sensor system 140. "Sensor" means any device, component and/or system that can detect, determine, assess, measure, quantify and/or sense something. In arrangements in which the sensor system 140 includes a plurality of sensors, the sensors can work independently from each other or one or more of the sensors can work in combination with each other. The sensor system 140 and/or the one or more sensors can be operatively connected to the processor 105, the data store 110, the navigation module 130 and/or other element of the navigation system 101.

The sensor system 140 can include any suitable type of sensor. For example, in one or more arrangements, the sensor system 140 can include one or more sensors configured to detect, determine, assess and/or sense whether a toll payment device is operatively associated with the vehicle 102.

Figure 2:
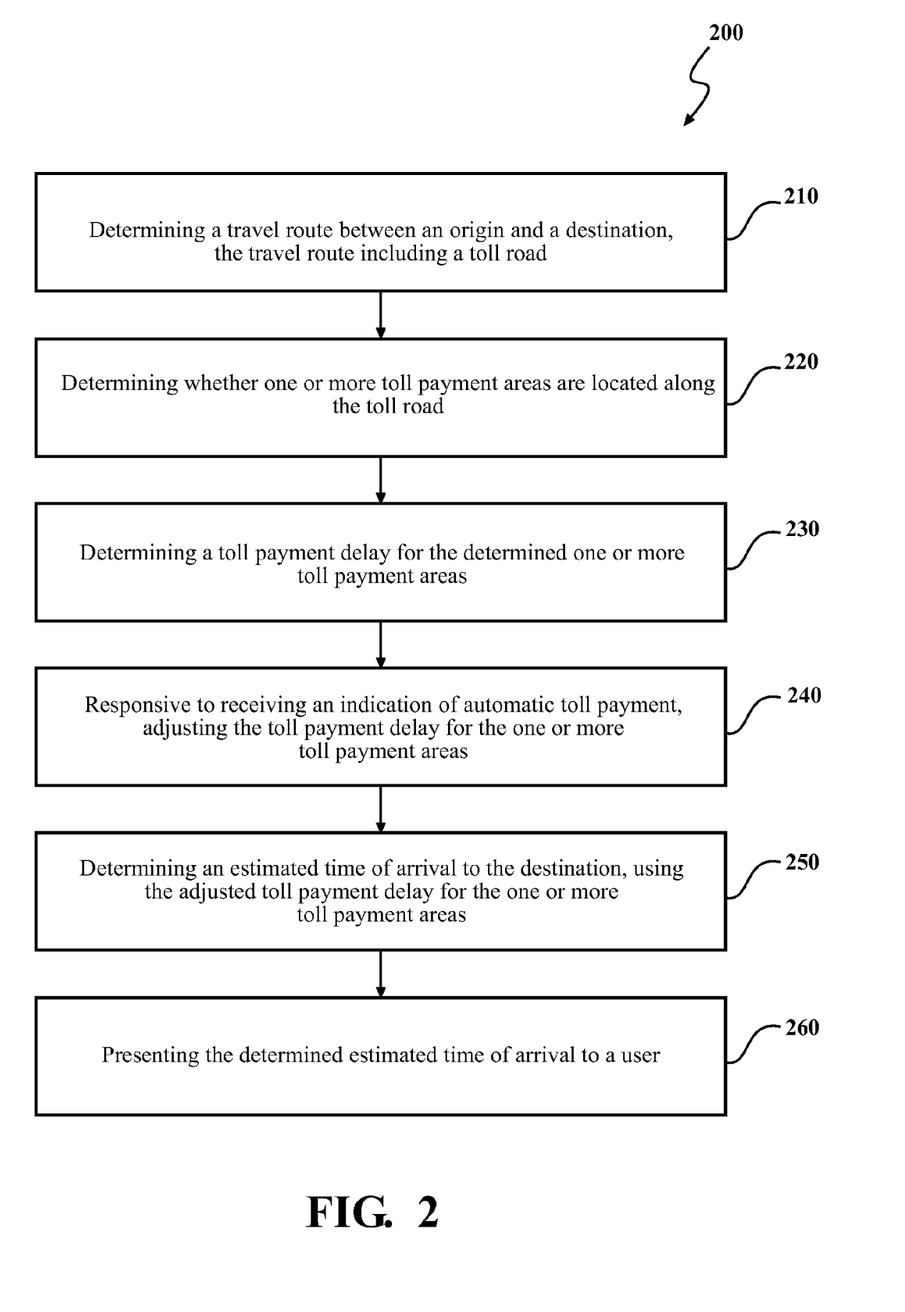
FIG. 2 is a method of determining an estimated time of arrival.

Now that the various potential systems, devices, elements and/or components have been described, various methods for determining an estimated time of arrival will now be described. Referring now to FIG. 2, one example of a method of determining an estimated time of arrival when a travel route includes one or more toll roads is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, a travel route between an origin and a destination can be determined. The origin and destination can be input into the navigation system 101 by, for example, a vehicle occupant. In one or more arrangements, the origin and/or the destination can be automatically input. For instance, the origin may be automatically input based of a detected current location of the navigation system 101 and/or vehicle 102. Alternatively or in addition, the origin and/or the destination can be obtained from any suitable source. For example, the one or more data stores 110 can store one or more contacts, addresses, default locations (as set by a user or some other entity), previous origins and/or destinations, frequent origins and/or destinations, etc. The travel route can also include any user travel preferences, such as preferred or non-preferred roads, preferred or non-preferred types of roads or preferred route parameters (e.g. shortest amount of time, shortest distance, etc.).

The travel route can be determined in any suitable manner, such as by using any suitable mapping application. In one or more arrangements, the travel route can be determined by the processor 105 and/or the navigation module 130. In some instances, a plurality of travel routes can be determined. In such instances, a user may select the desired travel route, or a travel route may be automatically selected based on a predetermined criteria. In some instances, the determined travel route can include one or more toll roads. If the determined travel route does not include one or more toll roads, the method 200 can end. However, if the determined travel route includes one or more toll roads, the method 200 can continue to block 220.

At block 220, it can be determined whether one or more toll payment areas are located along the toll road. Such information may be obtained from any suitable source. For instance, such information may be included in the data store 110, the navigation module 130, or in a source external to the vehicle (e.g. traffic data source(s) 170). The method 200 can continue to block 230.

At block 230, a toll payment delay for the one or more toll payment areas can be determined. For example, the toll payment delay can be a predetermined amount, which can be obtained from any suitable source. For instance, such information may be included in the data store 110, the navigation module 130, or in a source external to the vehicle (e.g. traffic data source(s) 170). In one or more arrangements, the traffic delay can be determined based on current traffic conditions. For instance, such information can be obtained from any suitable source (e.g. traffic data source(s) 170). In such case, the traffic delay for each toll booth can vary over time. The method 200 can continue to block 240.

At block 240, an indication of automatic payment of tolls can be received. The indication of automatic payment of tolls can be received in any suitable manner. In one or more arrangements, the indication of automatic payment of tolls can be input by a user. As an example, a user can input the indication of automatic payment of tolls using the input system 115 of the navigation system 101. As an example, the indication of automatic payment of tolls can be input by a touch screen or a microphone. In one or more arrangements, the indication of automatic payment of tolls can be determined automatically. For instance, the sensor system 140 can detect the presence of the automatic toll payment device 103 within a predetermined distance of the sensor system 140. An indication of automatic payment of tolls can be considered as being received if the automatic toll payment device 103 is detected.

Responsive to receiving the indication of automatic toll payment, the toll payment delay for the one or more toll payment areas can be adjusted. The adjustment of the toll payment delay can occur in any suitable manner, including in any of the ways described herein. It should be noted that, in one or more arrangements, if an indication of automatic toll payment is not received, the toll payment delay may not be adjusted. The method 200 can continue to block 250.

At block 250, an estimated time of arrival to the destination can be determined. The estimated time of arrival can be determined in any suitable manner. For instance, the determination of the estimated time of arrival can include adding or otherwise using the adjusted toll payment delay for the one or more toll payment areas located along the determined travel route. The method can continue to block 260.

At block 260, the determined estimated time of arrival can be presented to a user. The estimated time of arrival can be presented in any suitable manner. For instance, the estimated time of arrival can be presented in a visual manner and/or in an audible manner, such as by being presented by one or more components of the output system 120.

Figure 3:
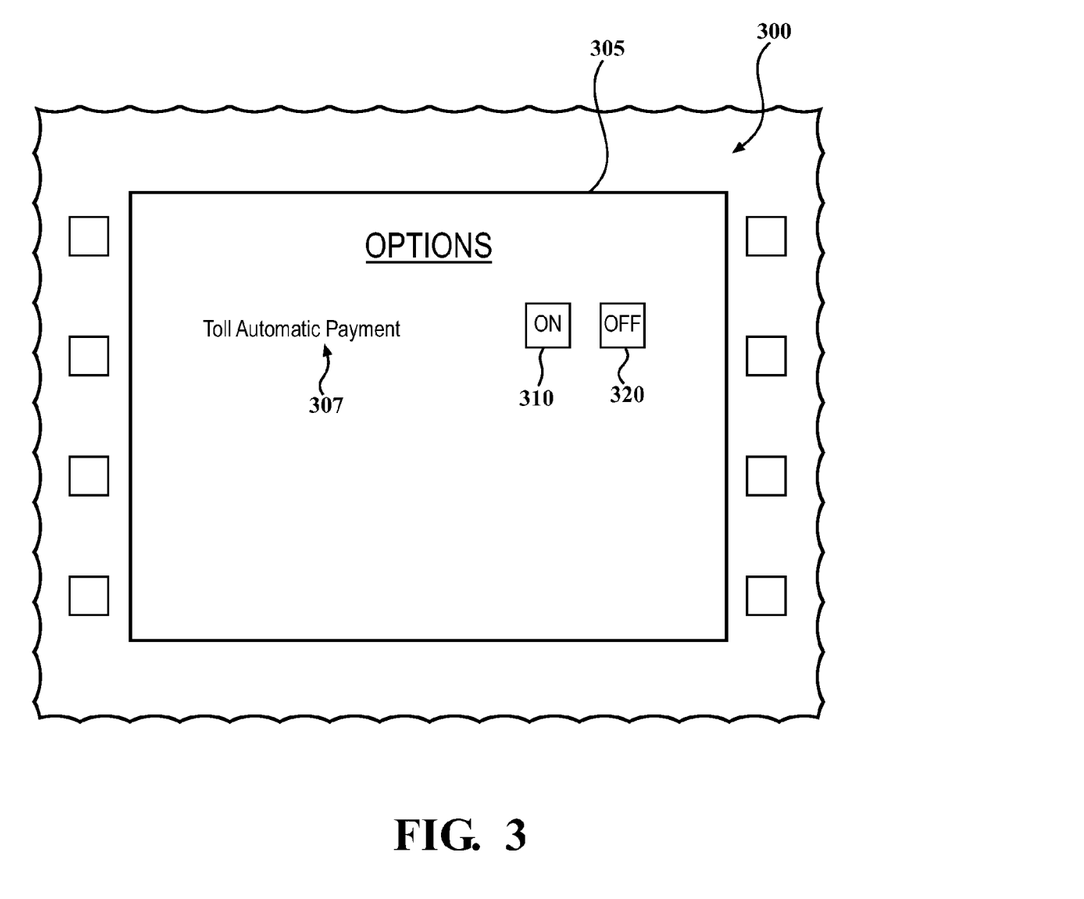
FIG. 3 is an example of an options screen presented on a display, the options screen including a toll automatic payment option for purposes of determining an estimated time of arrival.
Figure 4:
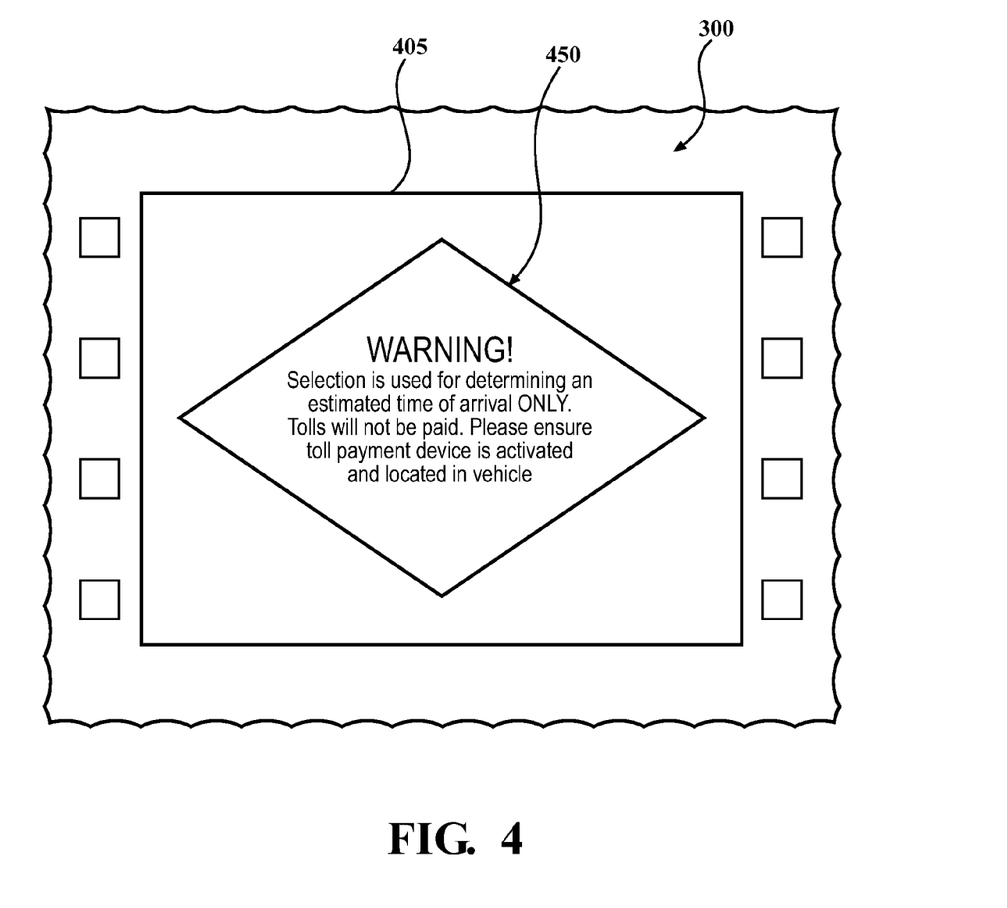
FIG. 4 is an example of a warning screen presented on the display.
Figure 5:
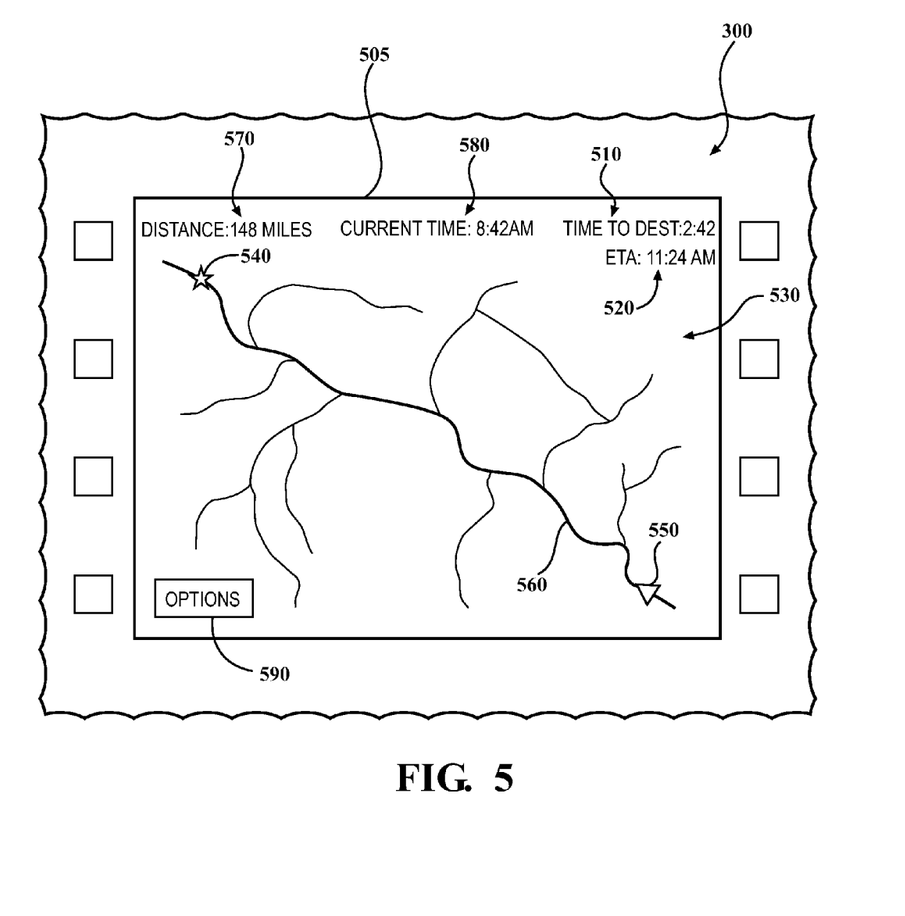
FIG. 5 is an example of an estimated time of arrival and other travel-related information presented on the display.

A non-limiting example of the determined an estimated time of arrival in accordance with systems and methods described herein will now be presented in relation to FIGS. 3-5. According to arrangements herein, an indication of automatic payment of tolls can be input in any suitable manner. For instance, referring to FIG. 3, a user can be presented with an options screen 305. For instance, the options screen 305 can be presented on a display 300. The display 300 can be a part of the output system 120 and/or the input system 115 of the navigation system 101. The options screen 305 can be presented at any suitable time. For instance, the options screen 305 can be presented at every use of the navigation system 101 for a travel route. As another example, the options screen 305 can be presented when a determined or selected travel route is determined to include one or more toll roads. As another example, the options screen can be presented in response to receiving a user input to access the options screen 305.

A "display" is defined as a component or a group of components that present information/data in visual form, including, for example, video, images, graphics, etc. In one or more arrangements, the display 300 can be located in a front interior portion of a vehicle 102. As an example, the display 300 can be included in a dashboard or instrument panel (not shown) of the vehicle 102.

The display 300 can be any suitable type of display. The display 300 can be any suitable type of display. For instance, the display 300 can be a liquid crystal display (LCD), a light emitting diode (LED) display or some other suitable display. In one or more arrangements, the display 300 can be a touch screen display, a multi-touch display or a remotely controlled display. A touch screen can allow a user to engage or interact with one or more displayed elements, such as a graphical user interface (GUI), and/or other applications running on any vehicle system, including any of those described herein, through contact with the display 300. For example, a user may make selections and move a cursor by simply touching the display 300 via a finger or stylus.

The options screen 305 can present one or more options for user input with respect to the navigation system 101. In FIG. 3, a toll automatic payment option 307 is presented. While the toll automatic payment option 307 is the only option shown in FIG. 3, it will be understood that one or more other options may be available.

The options screen 305 can be configured to provide an interface to allow a user to indicate whether tolls will be automatically paid. The user can provide such an indication in any suitable manner. For instance, the display 300 and/or the input system 115 can include one or more user interface elements. A "user interface element" is defined as a component or a group of components that enables a user to interact with a machine. In one or more arrangements, the options screen 305 can provide one or more graphical user interface elements. The term "graphical user interface element" is defined as an image or a portion of an image that presents information to a user or allows the user to interact with a device through a display.

The graphical user interface elements can have any suitable form. In one or more arrangements, the graphical user interface elements can include one or more buttons, such as an ON button 310 and an OFF button 320. A user can select enable or disable the toll automatic payment option 307 by engaging the appropriate one of the buttons 310, 320, such as with a finger, pointer or a stylus. The user's selection can be implemented as a default setting for all future usage of the navigation system 101 unless otherwise changed. Alternatively, the user's selection can be implemented for a one-time use and/or for a temporary period of time. For instance, the user's selection can be implemented for a single travel route. If a query for a new travel route is submitted, the options screen 305 or other prompt may be presented to the user again.

If the user selects the OFF button 320, then, for purposes of determining an estimated time of arrival, the navigation system 101 can be configured to treat the vehicle 102 as if it is not equipped and/or not enabled to automatically pay tolls at toll payments areas located along toll roads included in the travel route. Accordingly, the estimated time of arrival can be determined using (e.g. by adding) the toll payment delay associated with each toll payment booth located along the travel route.

If the user selects the ON button 310, then, for purposes of determining an estimated time of arrival, the navigation system 101 can be configured to treat the vehicle 102 as if it is equipped and/or enabled to automatically pay tolls at toll payments areas located along any toll roads included in the travel route. Accordingly, the estimated time of arrival can be determined using (e.g. by adding) the adjusted toll payment delay associated with each toll payment booth located along the travel route.

In one or more arrangements, if the user selects to enables the toll automatic payment option 307, a warning can be presented to the user. The warning can warn, alert, advise, indicate or inform the user of one or more things associated with the user's selection of the toll automatic payment option 307. For instance, the warning can indicate that the selection of toll automatic payment is used for determining an estimated time of arrival only. The warning can also indicate that the selection does not result in tolls being automatically paid. The warning can also advise the user to ensure that a toll payment device is located in the vehicle, the toll payment device must be activated, the toll payment device must be in working condition and/or the account associated with the toll payment device must be in good standing.

In one or more arrangements, the warning can be presented as a visual output. "Visual output" is any output that provides information in a manner that is perceptible to the human sense of sight. One example of a warning being presented as a visual output is shown in FIG. 4. In this example, a warning 450 can be presented on a warning screen 405 on the display 300. The warning screen 405 can be presented for a predetermined amount of time, or it can be presented until an input is received to close or minimize the warning screen 405.

Alternatively or in addition, the warning can be presented as an audial output. "Audial output" is any output that provides information in a manner that is perceptible to the human sense of hearing. The audial output can be presented by one or more components of the output system 120, such as by being emitted over one or more speakers. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals.

The determined estimated time of arrival can be presented in any suitable manner. For instance, the estimated time of arrival can be presented as a visual output. As an example, as is shown in FIG. 5, the estimated time of arrival can be presented on the display 300. In one or more arrangements, the estimated time of arrival can be expressed as an amount of time to arrive at the destination 510 or as the time at which the vehicle will arrive 520.

In one or more arrangements, the estimated time of arrival can be presented on a separate screen. In one or more arrangements, the estimated time of arrival can be presented with additional information or data. One example of a screen 505 in which the estimated time of arrival can be presented with additional information or data is shown in FIG. 5. Any suitable information can be presented in addition to the estimated time of arrival. For instance, a map 530 of at least a portion of a selected or determined travel route 560 can be presented. The map 530 can present graphical, photographic, video and/or map information or data, which can be obtained from any suitable source, including, for example, from the data store 110, the navigation module 130 and other source to which one or more elements of the navigation system 101 and/or the vehicle 102 are operatively connected.

An origin 540 and a destination 550 can be indicated on the map 530. In one or more arrangements, the screen 505 can enable a user to selectively zoom in and out on the map 530. The current location of the vehicle 102 and/or the navigation system 101 can be indicated on the map 530. The information presented on the travel route screen, including the estimated time of arrival 510, 520, can be updated in real-time.

Further examples of additional information that can be presented on the screen 505 can include the total distance of the travel route 570 and/or the current time 580. Further, the screen 505 can present the travel directions as a list view. In one or more arrangements, the screen 505 can present an options button 590. The options button 590 is selected, the options screen 305 (FIG. 3) can be presented on the display 300.

Alternatively or in addition to presenting the estimated time of arrival in a visual manner, the estimated time of arrival can be presented as an audial output. The audial output can inform a vehicle occupant or other user of the navigation unit of the estimated time of arrival at a destination. The audial output can be presented by one or more components of the output system 120, such as by being emitted over one or more speakers.

It will be appreciated that arrangements described herein can provide numerous benefits, including one or more of the benefits mentioned herein. For example, arrangements described herein can improve the accuracy of the estimated time of arrival determined by a navigation system and/or vehicle. Arrangements described herein can increase user satisfaction when using a navigation system.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for estimating time of arrival for vehicle navigation comprising:
   determining, using a processor, a travel route between an origin and a destination, the travel route including a toll road;
   determining, using a processor, whether one or more toll payment areas are located along the toll road;
   determining, using a processor, a toll payment delay for the one or more toll payment areas;
   responsive to receiving an indication of automatic toll payment, adjusting, using a processor, the toll payment delay for the one or more toll payment areas based on at least one of: a predetermined adjusted toll payment delay, a predetermined percentage, a predetermined amount of time, or a current actual delay time at an automatic toll payment area;
   determining, using a processor, an estimated time of arrival to the destination using the adjusted toll payment delay for the one or more toll payment areas; and
   presenting the determined estimated time of arrival to a user.

2. The method of claim 1, further including:
   responsive to receiving an indication of automatic toll payment, presenting a warning that tolls will not be automatically paid.

3. The method of claim 1, wherein receiving the indication of automatic toll payment includes receiving a user input corresponding to an indication of automatic toll payment.

4. The method of claim 1, wherein receiving the indication of automatic toll payment includes detecting the presence of an automatic toll payment device within a predetermined distance.

5. The method of claim 1, wherein adjusting the toll payment delay includes reducing the toll payment delay.

6. The method of claim 1, wherein adjusting the toll payment delay includes ignoring the toll payment delay.

7. The method of claim 1, further including:
identifying a type of the one or more toll payment areas located along the toll road, wherein, if the identified type of the one or more toll payment areas includes open road tolling, adjusting the toll payment delay includes ignoring the toll payment delay.

8. The method of claim 1, further including:
identifying a type of the one or more toll payment areas located along the toll road, wherein, if the identified type of the one or more toll payment areas includes a travel lane designated for automatic toll payments only, adjusting the toll payment delay includes reducing the toll payment delay.

9. The method of claim 1, further including:
identifying a type of the one or more toll payment areas located along the toll road, wherein, if the identified type of the one or more toll payment areas includes an automatic toll payment area,
determining whether or not there is an actual traffic delay at the automatic toll payment area; and
responsive to determining that there is an actual traffic delay at the automatic toll payment area, ignoring the indication of automatic toll payment.

10. The method of claim 9, further including:
responsive to determining that there is an actual traffic delay at the automatic toll payment area, determining an actual time delay at the automatic toll payment area; and
setting the toll payment delay to at least the actual time delay at the automatic toll payment area.

11. A system for determining an estimated time of arrival for vehicle navigation comprising:
a processor, the processor being programmed to initiate executable operations comprising:
determining a travel route between an origin and a destination, the travel route including a toll road;
determining whether one or more toll payment areas are located along the toll road;
determining a toll payment delay for the one or more toll payment areas;
responsive to receiving an indication of automatic toll payment, adjusting the toll payment delay for the one or more toll payment areas based on at least one of: a predetermined adjusted toll payment delay, a predetermined percentage, a predetermined amount of time, or a current actual delay time at an automatic toll payment area;
determining an estimated time of arrival to the destination using the adjusted toll payment delay for the one or more toll payment areas; and
presenting the determined estimated time of arrival to a user.

12. The system of claim 11, wherein the executable operations further include:
responsive to receiving an indication of automatic toll payment, presenting a warning that tolls will not be automatically paid.

13. The system of claim 11, wherein receiving the indication of automatic toll payment includes receiving a user input corresponding to an indication of automatic toll payment.

14. The system of claim 11, wherein receiving the indication of automatic toll payment includes detecting the presence of an automatic toll payment device within a predetermined distance.

15. The system of claim 11, wherein adjusting the toll payment delay includes reducing the toll payment delay.

16. The system of claim 11, wherein adjusting the toll payment delay includes ignoring the toll payment delay.

17. The system of claim 11, wherein the executable operations further include:
identifying a type of the one or more toll payment areas located along the toll road, wherein, if the identified type of the one or more toll payment areas includes open road tolling, adjusting the toll payment delay includes ignoring the toll payment delay.

18. The system of claim 11, wherein the executable operations further include:
identifying a type of the one or more toll payment areas located along the toll road, wherein, if the identified type of the one or more toll payment areas includes a travel lane designated for automatic toll payments only, adjusting the toll payment delay includes reducing the toll payment delay.

19. The system of claim 11, wherein the executable operations further include:
identifying a type of the one or more toll payment areas located along the toll road, wherein, if the identified type of the one or more toll payment areas includes an automatic toll payment area,
determining whether or not there is an actual traffic delay at the automatic toll payment area; and
responsive to determining that there is an actual traffic delay at the automatic toll payment area, ignoring the indication of automatic toll payment.

20. The system of claim 19, wherein the executable operations further include:
responsive to determining that there is an actual traffic delay at the automatic toll payment area, determining an actual time delay at the automatic toll payment area; and
setting the toll payment delay to at least the actual time delay at the automatic toll payment area.

* * * * *